US006897258B2

(12) United States Patent  
Takano et al.

(10) Patent No.: US 6,897,258 B2  
(45) Date of Patent: May 24, 2005

(54) COMPATIBILIZING AGENT, RADICAL POLYMERIZABLE RESIN COMPOSITION, MOLDING MATERIAL, AND MOLDED ARTICLE

(75) Inventors: Akira Takano, Osaka (JP); Takashi Yasumura, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 91 days.

(21) Appl. No.: 10/339,406

(22) Filed: Jan. 10, 2003

(65) Prior Publication Data

US 2003/0166775 A1 Sep. 4, 2003

Related U.S. Application Data

(63) Continuation of application No. 09/699,687, filed on Oct. 31, 2000, now Pat. No. 6,555,618.

(30) Foreign Application Priority Data

Nov. 5, 1999 (JP) .......................................... 11-315103

(51) Int. Cl.$^7$ .............................................. C08L 25/00
(52) U.S. Cl. ..................... 525/88; 525/92 R; 525/92 C; 525/92 H; 525/90; 525/91; 525/126; 525/127; 525/130; 525/131; 525/111; 525/177; 525/122; 525/92 F
(58) Field of Search ................................. 525/88, 92 R, 525/92 C, 92 H, 90, 91, 126, 127, 130, 131, 111, 177, 122, 92 F

(56) References Cited

U.S. PATENT DOCUMENTS

| 3,836,600 | A |   | 9/1974 | Brewbaker et al. |
| 3,947,422 | A |   | 3/1976 | Tatum et al. |
| 5,395,888 | A | * | 3/1995 | Franke et al. ............... 525/131 |
| 6,555,618 | B1 | * | 4/2003 | Takano et al. |

FOREIGN PATENT DOCUMENTS

| DD | DD 273266 | 11/1989 |
| EP | 0 272 536 | 6/1988 |
| EP | 0 418 913 | 3/1991 |
| JP | 3-174424 | 7/1991 |
| JP | 11-92646 | 4/1999 |

OTHER PUBLICATIONS

Dinsch et al.; CAPLUS AN 1990; 479889, Abstracting DD 273266 (1990).
Grainger et al., Polym. Mater. Sci. Eng. 53, 21–5 (1985).
Xie et al.; "Synthesis and Properties of Multiblock Copolymers of Styrene and Propylene Oxide," Polymer Journal, vol. 20, no. 2, Feb. 15, 1988, pp. 153–158.

* cited by examiner

Primary Examiner—Jeffrey Mullis
(74) Attorney, Agent, or Firm—Armstrong, Kratz, Quintos, Hanson & Brooks, LLP

(57) ABSTRACT

An object of the present invention is to provide a practical compatibilizing agent which makes it possible to convert the resin mixture into a homogeneous resin mixture free from separation and to eliminate defects caused by separation on molding by prevention of the separation between the radical polymerizable unsaturated resin and low profile additive, which could have not been attained by the prior art. This compatibilizing agent is a compatibilizing agent for compatibilizing a radical polymerizable unsaturated resin with a polymer containing styrene as a principal component, said compatibilizing agent being a compound (D) obtained by reacting a polymeric compound (A), a polymeric compound (B), and a compound (C), characterized in that: the polymeric compound (A) is at least one polymeric compound which is a polymer containing styrene as a principal component and has within a molecule one or more functional groups capable of reacting with the compound (C); the polymeric compound (B) is at least one polymeric compound having within a molecule one or more functional groups capable of reacting with the compound (C), which is selected from polyester, polyether, and polycarbonate; and the compound (C) is a compound which, within a molecule, has one or more functional groups capable of reacting with the polymeric compound (A) and has one or more polyfunctional groups capable of reacting with the functional group of the polymeric compound (B).

9 Claims, No Drawings

COMPATIBILIZING AGENT, RADICAL POLYMERIZABLE RESIN COMPOSITION, MOLDING MATERIAL, AND MOLDED ARTICLE

This application is a Continuation of prior application Ser. No. 09/699,687 filed Oct. 31, 2000 now U.S. Pat. No. 6,655,618, which is hereby incorporated by reference.

BACKGROUND OF THE INVENTION

1. Field of the Invention

The present invention relates to a novel compatibilizing agent for compatibilizing a radical polymerizable unsaturated resin with a polymer containing styrene as a principal component, a radical polymerizable resin composition, a molding material, and a molded article. More particularly, the present invention provides a means for solving problems of storage and molding caused by poor compatibility by improving the compatibility of the radical polymerizable resin with the polymer containing styrene as a principal component. The present invention also provides a compatibilizing agent which makes it possible to convert the resin mixture into a homogeneous resin mixture free from separation and to attain a highly value-added product.

2. Description of the Related Art

Radical polymerizable unsaturated resins are suitably used as raw resins for molding materials. However, molding materials using radical polymerizable unsaturated resin have large problems in which volume reduction, which occurs on curing, causes warpage and cracks in the molded article. For the purpose of overcoming this problem, various thermoplastic resins, for example, low profile additives such as polystyrene, styrene-butadiene rubber and the like are used. However, since these low profile additives have poor compatibility with the radical polymerizable unsaturated resin and separation after mixing is unavoidable, the resin mixture does not convert well into a homogeneous resin mixture free from separation because of its poor separation stability. Therefore, separation of the mixed low profile additive caused various molding defects such as scumming, segregation and the like.

Thus, a method of adding a stabilizer as a third component is employed and U.S. Pat. No. 3,836,600 discloses an example where a styrene-ethylene oxide block copolymer prepared by a living anionic polymerization method is used as the stabilizer. This stabilizer exerts a high compatibilizing effect and can maintain a stable dispersion state for a long period of time. However, it is difficult to industrially produce the compatibilizing agent because of its special synthesis procedure.

On the other hand, Japanese Unexamined Patent Application, First Publication No. Hei 3-174424 and Japanese Unexamined Patent Application, First Publication No. Hei 11-92646 disclose a method of improving the compatibility by introducing a vinyl acetate block or a functional group into a low profile additive. These improved low profile additives have an effect of retarding the time required to separate, but a stable dispersion state is still to be obtained by essentially improving the compatibility.

BRIEF SUMMARY OF THE INVENTION

An object of the present invention is directed to a compatibilizing agent which essentially improves the compatibility between a radical polymerizable unsaturated resin and a low profile additive containing styrene as a principal component, thereby to prevent molding defects caused by separation on molding or exhibit a stable dispersion state for a long period of time in the state of a resin mixed solution. That is, an object of the present invention is to provide a practical compatibilizing agent which makes it possible to convert the resin mixture into a homogeneous resin mixture free from separation and to eliminate defects caused by separation on molding by prevention of the separation between the radical polymerizable unsaturated resin and low profile additive, which could have not been attained by the prior art.

The present inventors have intensively studied about these objects, thus completing the present invention.

The present invention provides a compatibilizing agent for compatibilizing a radical polymerizable unsaturated resin with a polymer containing styrene as a principal component, said compatibilizing agent being a compound (D) obtained by reacting a polymeric compound (A), a polymeric compound (B), and a compound (C), characterized in that: the polymeric compound (A) is at least one polymeric compound which is a polymer containing styrene as a principal component and has within a molecule one or more functional groups capable of reacting with the compound (C); the polymeric compound (B) is at least one polymeric compound having within a molecule one or more functional groups capable of reacting with the compound (C), which is selected from polyester, polyether, and polycarbonate; and the compound (C) is a compound which, within a molecule, has one or more functional groups capable of reacting with the functional group of the polymeric compound (A) and has one or more polyfunctional groups capable of reacting with the functional group of the polymeric compound (B). Preferably, the functional groups of the polymeric compound (A) capable of reacting with the compound (C) are one or more functional groups selected from a hydroxyl group, a carboxyl group, an epoxy group, an amino group, and a mercapto group. Preferably, the functional groups of the polymeric compound (B) capable of reacting with the compound (C) are one or more functional groups selected from a hydroxyl group, a carboxyl group, an epoxy group, an amino group, and mercapto group. Preferably, the functional groups of the compound (C) are one or more functional groups selected from an isocyanate group, a hydroxyl group, a carboxyl group, an epoxy group, and an amino group. Preferably, the compound (C) is an organopolyisocyanate compound. Preferably, at least one of the functional groups of the polymeric compound (A) is located at a molecular terminal of the compound. Preferably, the weight ratio (B)/(A) of the polymeric compound (A) and the polymeric compound (B) contained in a molecule of the compound (D) as a principal component of the compatibilizing agent is within a range of 0.2–5. Preferably, the total of the number of molecules of the polymeric compound (A) and the number of molecules of the polymeric compound (B) contained in a molecule of the compound (D) as a principal component of the compatibilizing agent is 3 or less. Preferably, the number-average molecular weight of the compound (D) as a principal component of the compatibilizing agent is within a range of 1,000 to 60,000. The present invention further provides a radical polymerizable resin composition comprising the compatibilizing agent, a radical polymerizable unsaturated resin, and a polymerizable unsaturated monomer; a molding material comprising the radical polymerizable resin composition, a polymer containing styrene as a principal component, and the compatibilizing agent; and a molded article thereof.

According to the present invention, there can be provided a practical compatibilizing agent which makes it possible to convert the resin mixture into a homogeneous resin mixture free from separation and to eliminate defects caused by separation on molding by prevention of the separation between the radical polymerizable unsaturated resin and low profile additive, which could have not been attained by the prior art, thus making it possible to obtain a molded article which is free from scumming and has excellent uniform coloring properties, surface smoothness, and surface gloss.

DETAILED DESCRIPTION OF THE INVENTION

The present invention will be described in detail below. The polymeric compound (A), which is a polymer containing polystyrene as a principal component and has one or more functional groups, is not limited with respect to the synthesis procedure, structure or the like, as far as it is a polymer which has one or more functional groups and contains styrene as a principle component. For example, a polystyrene compound having a functional group at terminal can be synthesized by a method such as radical polymerization using an azo initiator, and living anionic polymerization, while a polystyrene compound having within a molecule a functional group can be synthesized by copolymerizing styrene with a functional group-containing unsaturated monomer. There is also included a compound in which the styrene-conjugated diene block copolymer is epoxidated in unsaturated binding parts.

The ratio of styrene in the polymeric compound (A) is preferably not less than 50% by weight, and more preferably not less than 70% by weight. When the ratio of styrene is smaller than the above range, performances for a compatibilizing agent are poor.

Preferably, the functional groups of the polymeric compound (A) capable of reacting with the compound (C) are one or more functional groups selected from a hydroxyl group, a carboxyl group, an epoxy group, an amino group, and a mercapto group. In addition, these functional groups are preferably located at a molecular terminal of the polymer. The average number of functional groups per molecule of the compound (A) is not limited. However, it is necessary to properly select the reaction procedure and the number of functional groups of the compound (B) depending to this number. Preferred number of functional groups is within a range of 1–4, and preferably within a range of 1–2.

The number-average molecular weight of the polymeric compound (A) is preferably 500 or more, and more preferably within a range of 1,000–50,000. Too small and too large molecular weights give poor effect for a compatibilizing agent.

The polymeric compound (B) is not limited with respect to the synthesis procedure, structure or the like, as far as it is at least one polymeric compound having one or more functional groups within a molecule, which is selected from polyester, polyether, and polycarbonate.

As the polyether, for example, there can be used polyethers such as polyethylene glycol, polypropylene glycol and Pluronic type one. As the polyester, there can be used saturated and unsaturated polyesters obtained from an α,β-unsaturated carboxylic acid or a saturated carboxyric acid and an alcohol, or a polyester obtained by ring-opening polymerization of caprolactone, which is described below. As the polycaprolactone, there can be used polycarbonate obtained by reacting an alcohol with a carbonate such as dimethyl carbonate and diethyl carbonate, which is described below. These are used alone or in combination.

The functional groups capable of reacting with the compound (C) of the polymeric compound (B) are preferably one or more functional groups selected from a hydroxyl group, a carboxyl group, an epoxy group, an amino group, and a mercapto group. The functional groups are preferably located at a molecular terminal of the polymeric compound (B). The average number of functional groups in a molecule of the polymeric compound (B) is preferably within a range of 1–4, and more preferably within a range of 1–2.

The number-average molecular weight of the polymeric compound (B) is preferably 300 or more, and more preferably within a range of 500–10,000. Too small and too large molecular weights give poor effect for a compatibilizing agent.

The compound (C) having within a molecule one or more functional groups capable of reacting with the functional groups of the polymeric compound (A) and one or more functional groups capable of reacting with functional groups of the polymeric compound (B) is preferably a compound having one or more functional groups selected from an isocyanate group, a hydroxyl group, a carboxyl group, an epoxy group, an amino group, a chloroformate group, and a carbonic acid ester group. Examples of the compound include, but are not limited to, an organic polyisocyanate compound, a polyol compound (specifically, a polyhydric alcohol described below), a chloride dicarboxylate compound (adipoyl dichloride), a dicarboxylic acid-activated ester (adipoyl disuccinimide ester), a polyamine compound (hexamethylenediamine), a carbonate compound (dimethyl carbonate, diethyl carbonate), a bifunctional epoxy compound (bisphenol A diglycigyl ether), phosgene, thiophosgene, a bischloroformate compound (ethylene glycol bischloroformate), and the like. The number of functional groups is preferably 2. Among these compound, an organic polyisocyanate compound is preferably used in view of the reaction procedure and cost. The following shows functional groups which compound (C) may have and functional groups one of which the polymeric compound (A) or (B) should have corresponding to each functional group of compound (C):

| Functional group which compound (C) may have | | Functional group one of which the polymeric compound (A) or (B) should have |
|---|---|---|
| isocyanate group | → | hydroxyl group, carboxyl group, amino group, mercapto group |
| hydroxyl group | → | carboxyl group, epoxy group |
| carboxyl group | → | hydroxyl group, epoxy group, amino group |
| epoxy group | → | hydroxyl group, amino group, mercapto group, carboxyl group |
| amino group | → | epoxy group, carboxyl group |
| chloroformate group | → | hydroxyl group, amino group |
| carbonic acid ester group | → | hydroxyl group, amino group |

As the organic polyisocyanate compound, for example, there can be used 1,2-ethylene diisocyanate, 1,3-propylene diisocyanate, 1,4-butane diisocyanate, 1,6-hexamethylene diisocyanate, 4,4'-diphenylmethane diisocyanate, tolylene diisocyanate, xylylene diisocyanate, tolidine diisocyanate, naphthalene diisocyanate, 1,4-cyclohexane diisocyanate, 4,4'-dicyclohexylmethane diisocyanate, isophorone diisocyanate, hydrogenated xylylene diisocyanate and the like. In view of control of the reaction, a diisocyanate compound such as tolylene diisocyanate and isophorone diisocyanate is preferably used.

The weight ratio of the polymeric compound (A) to the polymeric compound (B) contained in a molecule of the compound (D) which is bonded by the compound (C) is an important factor which decides performances of the compatibilizing agent. The weight ration (B)/(A) of the polymeric compound (B) to the compound (A) contained in a molecule of the compound (D) is preferably within a range of 0.1–10, and more preferably within a range of 0.2–5.

The number-average molecular weight of the compound (D) is preferably within a range of 500–300,000, and more preferably within a range of 1,000–60,000. Too small and too large molecular weights give poor effect for a compatibilizing agent. As used herein, the number-average molecular weight is measured by gel permeation chromatography.

The total of the number of molecules of (A) and that of molecules of (B) contained in a molecule of the compound (D) is preferably 3 or less in average. When the total of the number of molecules of (A) and that of molecules of (B) contained in a molecule of the compound (D) exceeds 3, the effect of compatibilizing with a constant loading of the compatibilizing agent is equivalent or low.

The procedure of reacting the compounds (A), (B) and (C), the process of the reaction, and use of a catalyst and an activating agent are not limited, but there is a need of taking a suitable method of giving the total of the that number of molecules of the polymeric compound (B) contained in a molecule of the compound (D) as a principal component of the compatibilizing agent of 3 or less. The compound (D) as a principal component of the compatibilizing agent has preferably a structure of (A)-(C)-(B), (B)-(C)-(A)-(C)-(B), or (A)-(C)-(B)-(C)-(A) (these structural formulae schematically show the resultants of the reaction of compounds (A), (B), and (C), which have functional groups; in the formula, symbol "-" indicates a linking group resulted from the reaction of the functional groups of the compounds (A), (B), and (C) with each other; for example, in the case where an isocyanate group in compound (C) and a hydroxyl group in compound (A) are reacted, symbol "-" indicates a urethane linkage thus formed). The compatibilizing agent composition or the compatibilizing agent according to the present invention is a solution of a solvent in which a trace amount of by-products having a structure such as (A)-(C)-(A) and (B)-(C)-(B) are present.

The synthesis reaction of the compatibilizing agent may be carried out in a solvent or without using any solvent. Usually, the reaction is carried out in a solvent in view of working properties. Any solvent may be used as far as it is a solvent in which the compatibilizing agent dissolves, and which does not react with any functional group in each component. In case of mixing with a radical polymerizable unsaturated resin, the same polymarizable unsaturated monomer contained in the radical polymerizable unsaturated resin is preferably used.

The amount of the compound (D) required to compatibilize the radical polymerizable unsaturated resin with a polymer containing styrene as a principal component is preferably within a range of 0.02–20 parts by weight, and more preferably within a range of 0.05–5 parts by weight based on the total of the amount of the radical polymerizable unsaturated resin and the amount of the polymer containing styrene as a principal component as 100 parts by weight. When the amount is smaller than the above range, separation occurs. When the amount is larger than the above-range, physical properties are lowered.

The radical polymerizable unsaturated resin composition containing the compatibilizing agent of the present invention is composed of a radical polymerizable unsaturated resin such as unsaturated polyester, vinyl ester resin, vinyl urethane resin or acrylic resin, and a polymerizable unsaturated monomer. If necessary, additives such as polymerization inhibitors, curing catalysts, fillers, reinforcers, internal mold-releasing agents and pigments can be added.

The composition of the unsaturated polyester which can be used in the present invention includes, but not limited to, an unsaturated polyester obtained from the reaction of an α,β-unsaturated carboxylic acid or in some case, an α,β-unsaturated carboxylic acid containing a saturated carboxylic acid with a polyhydric alcohol.

The α,β-unsaturated carboxylic acid includes, for example, fumaric acid, maleic acid, maleic anhydride, itaconic acid, citraconic acid, methaconic acid, chloromaleic acid, dimethyl esters thereof and the like. These α,β-unsaturated carboxylic acids may be used alone or in combination. The saturated carboxylic acid includes, for example, phthalic acid, phthalic anhydride, isophthalic acid, terephthalic acid, HET® acid (Occidental Chemical), hexahydro phthalic anhydride, tetrahydro phthalic anhydride, adipic acid, sebatinic acid, azelaic acid or the like. These saturated carboxylic acids may be used alone or in combination.

The polyhydric alcohol includes, for example, diols such as ethylene glycol, diethylene glycol, propylene glycol, dipropylene glycol, trimethylene glycol, 1,3-butane diol, 1,4-butane diol, 1,3-pentane diol, 1,6-hexane diol, cyclohexane diol, neopentyl glycol, 2,2,4-trimethyl-1,3-pentane diol, glycerin monoallyl ether, hydrogenated bisphenol A, ethylene oxide and propylene oxide adducts of hydrogenated bisphenol A, 2,2-bis(4-hydroxypropoxyphenyl)propane, 2,2-bis(4-hydroxyethoxypenyl)propane and 2-methylpropane diol; triols such as trimethylol propane; or tetraols such as pentaerythritol. These alcohols may be used alone or in combination.

There can also be used a dicyclopentadiene modified unsaturated polyester obtained by adding dicyclopentadiene thereby to react with the α, β-unsaturated carboxylic acid, saturated carboxylic acid and polyhydric alcohol.

There can be also used a modified unsaturated polyester obtained by reacting the unsaturated polyester with a glycidyl compound such as glycidyl methacrylate.

The vinyl ester resin used in the present invention is a reaction product obtained by the reaction between an epoxy resin and an unsaturated monocarboxylic acid.

The epoxy resin includes, for example, glycidyl eters of polyvalent phenols such as bisphenol A epoxy resin, bisphenol F epoxy resin, phenol novolac epoxy resin, cresol novolac epoxy resin and brominated epoxy resin; glycidyl ethers of polyvalent alcohols such as dipropylene glycol diglycidyl ether, trimethylolpropane triglycidyl ether and diglycidyl ether of bisphenol A alkylene oxide adduct; alicyclic epoxy resins such as 3,4-epoxy-6-methylcyclohexylmethyl-3,4-epoxy-6-methylcyclohexane carboxylate, 3,4-epoxycyclohexylmethyl-3,4-epoxycyclohexane carboxylate and 1-epoxyetyl-3,4-epoxycyclohexane; glycidyl esters such as diglycidyl phthalate, diglycidyl tetrahydrophthalate, diglycidyl p-oxybenzoic acid and glycidyl dimer acid; glycidylamines such as tetraglycidylaminodiphenylmethane, tetraglycidyl m-xylylenediamine, triglycidyl p-aminophenol and N,N-diglycidylaniline; heterocyclic epoxy resins such as 1,3-diglycidyl-5,5-dimethylhydantoin and triglycidyl isocyanate; or 2,2',4,4'-tetraglycidxybiphenyl, dimethybisphenol C diglycidyl ether, bis-β-trifluoromethyl diglycidyl bisphenol A and the like. These epoxy resins may be used alone or in combination:

The unsaturated monocarboxylic acid includes, for example, acrylic acid, methacrylic acid, crotonic acid, cinnamic acid, acrylic acid dimer, monomethyl maleate, monopropyl maleate, monobutyl maleate, mono(2-ethylhexyl) maleate, or sorbic acid. These acids may be used alone or in combination.

A glycidyl compound is preferably glycidyl(meth) acrylate.

A vinyl urethane resin is an oligomer obtained from polyol compounds, organic polyisocyanate compounds, or hydroxyl-containing (meth)acrylates. The polyol compound refers to a generic name of a compound having within a molecule plural hydroxyl groups, but may be a compound having a functional group which has an active hydrogen capable of reacting with an isocyanate group in place of a hydroxyl group, for example carboxyl group, amino group, mercapto group. Such a polyol compound includes, for example, polyester polyol, polyether polyol, acryl polyol, polycarbonate polyol, polyolefin polyol, castor oil polyol, or caprolactone polyol. These polyol compounds may be used alone or in combination. As the organic polyisocyanate compound, there can be used those described above.

An acrylic resin is composed of a thermoplastic acrylic polymer derived from (meth)acrylate and a polymerizable unsaturated monomer containing (meth)acrylate as a principal component and polymerizable unsaturated monomers. It can be obtained by polymerizing a mixed monomer solution, which contains (meth)acrylate as an essential component and, if necessary, other polymerizable unsaturated monomers capable of copolymerizing with the (meth) acrylates.

The acrylic polymer preferably has a molecular weight of 100,000 or less because it is used in a form of syrup dissolved in the porymerizable monomer. The acrylic polymer can be obtained by a common polymerization procedure such as suspension polymerization and solution polymerization. Also, the syrup obtained by prepolymerizing the monomers in a degree of 10–40% can be used as it is.

As the polymerizable unsaturated monomer, there can be used aromatic vinyl compounds such as styrene, α-methylstyrene, vinyltoluene and chlorostyrene, and (meth)acrylates. There can also be used functional monomers, hydroxyl group-containing monomers such as hydroxylethyl(meth)acrylate, hydroxypropyl(meth)acrylate and hydroxybutyl(meth)acrylate, carboxyl group-containing monomers such as (meth)acrylate. Other unsaturated esters such as vinyl acetate and vinyl propionate; halogenated vinyl monomers such as vinyl chloride and vinylidene chloride; and unsaturated nitrites such as acrylonitrile and methacrylonitrile can be used in combination.

The amount of the polymerizable unsaturated monomer is not specifically limited, but is preferably within a range of 10–70% by weight, and more preferably within a range of 20–50% by weight, based on the radical polymerizable unsaturated resin such as (modified) unsaturated polyester, vinyl ester resin, vinyl urethane resin or acrylic resin. Accordingly, the ratio of the radical polymerizable unsaturated resin to the polymerizable unsaturated monomer is preferably within a range from 30–90% by weight to 10–70% by weight, and more preferably within a range from 50–80% by weight to 20–50% by weight, in the resin composition.

The polymerization inhibitor is added to prevent gelling due to polymerization on preparation or after reaction and adjust storage stability or curing properties of the resulting unsaturated polyester. The polymerization inhibitor is not limited and any conventionally known polymerization inhibitors can be used. Specific examples thereof include hydroquinone, methyl hydroquinone, p-tert-butyl catechol, tert-butyl hydroquinon, tolhydroquinone, p-benzoquinon, naphthoquinone, hydroquinone monomethyl ether, phenotiadine, copper naphthenate, copper chloride and the like. These polymerization inhibitors may be used alone, or used after mixing two or more sorts thereof, timely. The amount of the polymerization inhibitor is not limited.

As the curing catalyst, known high-temperature curing or ambient temperature curing catalysts can be used. As the high-temperature curing catalyst, for example, there can be used organic peroxides such as methylethylketone peroxide, tert-butylperoxy-2-ethylhexanoate, benzoyl peroxide, di-tert-butylperoxy-3,3,5-trimethylcyclohexane, tert-butylperoxybenzoate, dicumyl peroxide, and tert-butyl hydroperoxide. These curing catalysts may be used alone or in combination.

As the ambient temperature curing catalyst, for example, there can be used a curing system using metal salts such as cobalt naphthenate and cobalt octenate in combination with ketone peroxides such as methylethylketone peroxide and methylisobutylketone peroxide, or redox catalyst system using tertiary aromatic amines such as N,N-dimethylaniline in combination with acyl peroxides such as benzoyl peroxide.

Examples of the filler includes calcium carbonate, magnesium carbonate, barium sulfate, mica, talc, kaolin, clay, Celite, asbestos, perlite, baryta, silica, quartz sand, dolomite, limestone, gypsum, aluminum fine-powder, hollow balloon, alumina, grass powder, aluminum hydroxide, white marble, zirconium oxide, antimony trioxide, titanium oxide, molybdenum dioxide and the like. These fillers are selected in view of workability, strength and appearance of the resulting molded article, economical efficiency and the like, but calcium carbonate, aluminum hydroxide, silica, and talc are commonly used.

The reinforcers may be those which are usually used as fiber reinforcesr. Examples thereof include grass fiber, polyester fiber, phenol fiber, polyvinyl alcohol fiber, aromatic polyamide fiber, nylon fiber, carbon fiber and the like. These reinforcers may be in the form of chopped strand, chopped strand mat, roving, textile and the like. These reinforcers are selected in view of the viscosity of the composition, strength of the resulting molded article and the like.

Examples of the internal mold-releasing agent include higher fatty acid such as stearic acid; higher fatty acid salt such as zinc stearate; and alkyl phosphate.

When preparing molding materials such as seat molding compound (hereinafter referred to as SMC) and bulk molding compound (hereinafter referred to as BMC), there can be added metal oxides and hydroxides such as magnesium oxide and calcium hydroxide as a thickening agent.

A viscosity reducing agent is added to improve the workability. The thickening agent is not limited as far as it reduces the viscosity of the resin composition.

In the present invention, the polymer containing styrene as a principal component, which is mixed with the radical polymerizable unsaturated resin-is not limited with respect the synthesis procedure, structure or the like as far as it is a polymer containing styrene as a principle component. For example, there can be used polystyrene, styrene-(unsaturated monomer) copolymer, styrene-(conjugated diene) block copolymer, hydrogenated styrene-(conjugated diene) block copolymer and the like. There can also be used those obtained by reacting double bonds in these polymers with other compounds. Specific examples thereof include styrene-butadiene block copolymer, styrene-isoprene block copolymer, styrene-(ethylene butylene) block copolymer, styrene-(ethylene propylene) block copolymer and the like.

The styrene-(unsaturated monomer) copolymer is not limited with respect to the synthesis procedure, the structure of the copolymer so far as it is a copolymer obtained by the polymerization between styrene and one or more polymerizable unsaturated monomers selected from the above-mentioned polymerizable unsaturated monomers. The styrene-(conjugated diene) block copolymers are block copolymers comprise styrene components obtained by polymerizing styrene with conjugated butadiene and conjugated diene components. As the conjugated diene components, there can be used butadiene, isoprene, 1,3-pentadiene and the like. In addition, styrene-hydrogenated conjugated diene block copolymer obtained by hydrogenating these styrene- (conjugated diene) block copolymer may be also used. The unit of the block copolymer is not limited, but includes repeat units of styrene and conjugated diene such as styrene-(conjugated diene), styrene-(conjugated diene)-styrene, and (conjugated diene)-styrene-(conjugated diene).

The radical polymerizable unsaturated resin composition of the present invention can be used to all purposes to which conventional radical polymerizable unsaturated resin compositions have been used. For example, the radical polymerizable unsaturated resin composition of the present invention can be used as a molding material (for press molding and injection molding as SMC and BMC, spray molding, hand lay-up molding, casting, pultrusion, resin transfer molding, metal matched die and the like), coating material (paint, putty, cosmetic plate, sealing material, and lining material). The molding materials comprise radical polymerizable unsaturated resin compositions, curing catalysts, fiber reinforcements and if necessary, additives such as fillers, internal mold-releasing agents and pigments.

Examples of the molding article of the present invention include house equipments such as bathtub, kitchen counter, lavatory, waterproof pan; civil building materials such as resin concrete, tank, septic tank, artificial marble, panel, corrugated board and pipe; automobile parts such as cylinder head cover and head lamp reflector; electric parts such as motor sealing material and circuit breaker; vessels such as ship and boat; and buttons, merchandises.

EXAMPLES

The present invention is illustrated by the following examples, but not limited to these examples. In the bellow examples, parts are by weight unless otherwise stated.

Example 1 (Synthesis of Compatibilizing Agent)

In a 1 liter four-necked flask equipped with a nitrogen introducing tube, 300 g of styrene, 200 g of polystyrene which has two hydroxyl groups at one terminal and a number-average molecular weight of 6000 (MACROMONONER HS-6, manufactured by Toagosei Co., Ltd.) as the polymeric compound (A), and 0.2 g of hydroquinone were charged and then heated to 70° C. in a nitrogen gas flow. Then, 0.2 g of dibutyltin laurate and 12 g of tolylene diisocyanate were charged and the mixture was reacted at 70° C. for two hours. To the reaction product, 136 g of polyethylene glycol having a number-average molecular weight of 2,000 as the polymeric compound (B) was added, followed by the reaction at 70° C. for three hours. Then, 0.1 g of toluhydroquinone was added and the reaction was conducted at 90° C. for two hours to obtain a compound (D). To the compound (D), 408 g of styrene was added, followed by cooling to obtain a compatibilizing agent solution having a solid content of 33%, which is taken as a compatibilizing agent solution A. The number-average molecular weight measured by gel permeation chromatography of the compound (D) thus obtained was 11,000.

Example 2 (Synthesis of Compatibilizing Agent)

In the same manner as in Example 1, except that 122 g of an unsaturated polyester resin having a number-average molecular weight of 1,800 (POLYLITE PS-367, manufactured by Dainippon Ink & Chemicals, Incorporated) was used in place of polyethylene glycol (B) having a number-average molecular weight of 2000, the reaction was conducted to obtain a compound (D). To the compound (D), 378 g of styrene was added, followed by cooling to obtain a compatibilizing agent solution having a solid content of 33%, which is taken as a compatibilizing agent solution B. The number-average molecular weight of the compound (D) thus obtained was 10,000.

Example 3 (Synthesis of Compatibilizing Agent)

In the same manner as in Example 1, except that polycarbonate diol having a number-average molecular weight of 2,000 (CX-5520, manufactured by Nissei Chemical Industry Co., Ltd.) was used in place of polyethylene glycol (B) having a number-average molecular weight of 2000, the reaction was conducted to obtain a compound (D). To the compound (D), 408 g of styrene was added, followed by cooling to obtain a compatibilizing agent solution having a solid content of 33%, which is taken as a compatibilizing agent solution C. The number-average molecular weight of the compound (D) thus obtained was 10,000.

Example 4 (Synthesis of Compatibilizing Agent)

In a 1 liter four-necked flask equipped with a nitrogen introducing tube, 300 g of styrene, 250 g of polystyrene having one hydroxyl group at one terminal and a number-average molecular weight of 9600, which has been synthesized with an azo-initiator as the polymeric compound (A), and 0.2 g of hydroquinone were charged and then heated to 70° C. in a nitrogen gas flow. Then, 0.2 g of dibutyltin laurate and 4.6 g of tolylene diisocyanate were charged and the mixture was reacted at 70° C. for two hours. To the reaction product, 104 g of polyethylene glycol having a number-average molecular weight of 4,000 as the polymeric compound (B) was added, followed by the reaction at 70° C. for three hours, subsequently at 90° C. for two hours to obtain a compound (D). To the compound (D), 429 g of styrene was added, followed by cooling to obtain a compatibilizing agent solution having a solid content of 33%, which is taken as a compatibilizing agent solution D. The number-average molecular weight of the compound (D) thus obtained was 14,000.

Comparative Example 1 (Synthesis of Compatibilizing Agent)

In the same manner as in Example 1, except that 14 g of polyethylene glycol having a number-average molecular weight of 200 was used in place of 136 g of polyethylene glycol (B) having a number-average molecular weight of 2,000, the reaction was conducted to obtain a compound (D). To the compound (D), 159 g of styrene was added, followed by cooling to obtain a compatibilizing agent solution having a solid content of 33%, which is taken as a compatibilizing agent solution E. The number-average molecular weight of the compound (D) thus obtained was 7,000.

Comparative Example 2 (Synthesis of Compatibilizing Agent)

In the same manner as in Example 4, except that 5.5 g of polyethylene glycol having a number-average molecular weight of 200 was used in place of 104 g of polyethylene glycol (B) having a number-average molecular weight of 4,000, the reaction was conducted to obtain a compound (D). To the compound (D), 229 g of styrene was added, followed by cooling to obtain a compatibilizing agent solution having a solid content of 33%, which is taken as a compatibilizing agent solution F. The number-average molecular weight of the compound (D) thus obtained was 11,000.

The compatibilizing agent solutions A-F obtained thus are collectively shown in Table 1. Also, the weight ration (B)/(A) of the polymeric compound (A) and the polymeric compound (B) contained in a molecule of the compound (D) is shown, respectively. In addition, the total of the number of molecules of the polymeric compound (A) and the number of molecules of the polymeric compound (B) contained in the compound (D) is shown, respectively.

TABLE 1

|  | Example 1 | Example 2 | Example 3 | Example 4 | Comp. Example 1 | Comp. Example 2 |
|---|---|---|---|---|---|---|
| Compatibilizing agent solution | A | B | C | D | E | F |
| Types of polymeric compound (B) | Polyethylene glycol | Unsaturated polyester | Polycarbonate diol | Polyethylene glycol | Polyethylene glycol | Polyethylene glycol |
| (B)/(A) | 0.67 | 0.60 | 0.67 | 0.42 | 0.07 | 0.02 |
| Total of the number of molecules of (A) and (B) in a molecule of (D) | 3 | 3 | 3 | 2 | 3 | 2 |

Examples 5–8 and Comparative Examples 3–4

To 160 g of an unsaturated polyester resin (POLYLITE PS-367, manufactured by Dainippon Ink & Chemicals, Incorporated), 40 g of a 50% styrene monomer solution of polystyrene having a weight-average molecular weight of 280,000 and 6 g of a compatibilizing agent solution were added, followed by sufficient mixing with stirring. The time required to separation of a low profile additive was visually observed. The results are shown in Table 2.

TABLE 2

|  | Example 5 | Example 6 | Example 7 | Example 8 | Comp. Example 3 | Comp. Example 4 |
|---|---|---|---|---|---|---|
| Compatibilizing agent solution | A | B | C | D | E | F |
| Time requited to separation [Hour] | No separation | No separation | No separation | No separation | 12 | 9 |

Evaluation Procedure

Time required to separation: Each resin composition was mixed with stirring, charged in a glass bottle having a volume of 240 cc, and then allowed to stand in a room maintained at 23° C. Immediately after mixing, a uniform turbid resin composition was obtained in any of examples. The time required to reach the point of time at which separation of the low profile additive can be observed on the upper portion of the liquid was taken as the time requited to separation. In case where no separation occurred after a lapse of one month, we recorded "no separation" in the table.

Examples 9–12 and Comparative Examples 5 and 6

In a 2 liter four-necked flask equipped with a nitrogen and air introducing tube, 1000 g of a bisphenol A epoxy resin (epoxy eq. of 410), 210 g of methacrylic acid and 0.5 g of hydroquinone were charged and then heated to 90° C. in a nitrogen:oxygen 1:1 mixed gas flow. Then, 2.5 g of 2-methylimidazol was charged and the mixture was heated to 105° C. to react for ten hours. The reaction product was cooled to 90° C., and then 220 g of styrene, 0.8 g of toluhydroquinone and 100 g of maleic anhydride was added the reaction was conducted for three hours. To the reaction product, 340 g of styrene was added, followed by cooling to obtain a vinyl ester resin having a solid content of 70%, which is taken as a vinyl ester resin A. In the same manner as in Example 5, except that a vinyl ester resin A was used in place of an unsaturated polyester resin, the time required to separation was evaluated. The results are shown in Table 3.

TABLE 3

|  | Example 9 | Example 10 | Example 11 | Example 12 | Comp. Example 5 | Comp. Example 6 |
|---|---|---|---|---|---|---|
| Compatibilizing agent solution | A | B | C | D | E | F |
| Time requited to separation [Hour] | No separation | No separation | No separation | No separation | 8 | 6 |

Examples 13–16 and Comparative Examples 7 and 8

In a 2 liter four-necked flask equipped with a nitrogen and air introducing tube, 1000 g of a novolac epoxy resin (epoxy eq. of 182), 470 g of methacrylic acid and 0.6 g of hydroquinone were charged and then heated to 90° C. in a nitrogen:oxygen 1:1 mixed gas flow. Then, 3 g of 2-methylimidazol was charged and the mixture was heated to 105° C. to react for ten hours. The reaction product was cooled to 90° C., and then 260 g of styrene, 1 g of toluhydroquinone and 215 g of maleic anhydride was added the reaction was conducted for three hours. To the reaction product, 460 g of styrene was added, followed by cooling to obtain a vinyl ester resin having a solid content of 70%, which is taken as a vinyl ester resin B. In the same manner as in Example 5, except that a vinyl ester resin B was used in place of an unsaturated polyester resin, the time required to separation was evaluated. The results are shown in Table 4.

TABLE 4

|  | Example 13 | Example 14 | Example 15 | Example 16 | Comp. Example 7 | Comp. Example 8 |
|---|---|---|---|---|---|---|
| Compatibilizing agent solution | A | B | C | D | E | F |
| Time requited to separation [Hour] | No separation | No separation | No separation | No separation | 11 | 9 |

Examples 17–20 and Comparative Examples 9 and 10

In the same manner as in Example 5, except that an acrylic syrup obtained by polymerizing methyl methacrylate in a degree of 30% by bulk polymerization was used in place of an unsaturated polyester, the time required to separation was evaluated. The results are shown in Table 5.

TABLE 5

|  | Example 17 | Example 18 | Example 19 | Example 20 | Comp. Example 9 | Comp. Example 10 |
|---|---|---|---|---|---|---|
| Compatibilizing agent solution | A | B | C | D | E | F |
| Time requited to separation [Hour] | No separation | No separation | No separation | No separation | 10 | 7 |

Examples 21–24 and Comparative Examples 11 and 12

In the same manner as in Example 51, except that a vinyl polyurethane resin obtained by mixing and dissolving 60 parts of a vinyl urethane obtained from propylene glycol (molecular weight of 600), isoholon diisocyanate and 2-hydroxyethyl methacrylate and 40 parts of methyl methacrylate was used in place of an unsaturated polyester, the time required to separation was evaluated. The results are shown in Table 6.

TABLE 6

|  | Example 21 | Example 22 | Example 23 | Example 24 | Comp. Example 11 | Comp Example 12 |
|---|---|---|---|---|---|---|
| Compatibilizing agent solution | A | B | C | D | E | F |
| Time requited to separation [Hour] | No separation | No separation | No separation | No separation | 12 | 10 |

Example 25

80 parts of an unsaturated polyester resin (POLYLITE PS-180, manufactured by Dainippon Ink & Chemicals, Incorporated), 0.06 parts of parabenzoquinone, 20 parts of 50& styrene monomer solution of polystyrene having a weight-average molecular weight of 280,000, 3 parts of the compatibilizing agent solution A, 4 parts of zinc stearate, 140 parts of calcium carbonate, a pigment (POLYTON GRAY PT-8809, manufactured by Dainippon Ink & Chemicals, Incorporated) and 1 part of tert-butyl perbenzoate as a catalyst were mixed and the mixture was sufficiently stirred until uniform dispersion. To the mixture, 1.3 parts of magnesium oxide as a thickening agent was further added, and then grass fiber having a fiber length of one inch as a reinforcement was dispersed so as to give the content of 25% by weight in the resulting unsaturated polyester resin composition to prepare SMC using a conventional SMC production unit. The resulting SMC was wrapped with aluminum-metallized sheet, and heated at 40° C. for about 24 hours. Then, said SMC was supplied into a mold adjusted to 145° C. for the upper mold and 135° C. for the lower mold, respectively and maintained under a pressure of 70 kgf/cm$^2$ (plane pressure) for 4 minutes to mold into a 30×30 cm plate having a thickness of 3 mm. Evaluations in terms of scumming, uniform coloring properties, surface smoothness and luster of the resulting molding articles were conducted according to the following methods. The results are shown in Table 7.

Example 26

In the same manner as in Example 25, except that a vinyl ester resin A was used in place of an unsaturated polyester resin, the evaluations were conducted. The results are shown in Table 7.

Example 27

In the same manner as in Example 25, except that a vinyl ester resin B was used in place of an unsaturated polyester resin, the evaluations were conducted. The results are shown in Table 7.

Comparative Example 13

In the same manner as in Example 25, except that a compatibilizing agent solution E was used in place of a compatibilizing agent solution A, the evaluations were conducted. The results are shown in Table 7.

Comparative Example 14

In the same manner as in Example 25, except that no compatibilizing agent solution was used, the evaluations were conducted.

TABLE 7

|  | Example 25 | Example 26 | Example 27 | Comp. Example 13 | Comp. Example 14 |
|---|---|---|---|---|---|
| Presence or absence of scumming | No | No | No | No | Yes |
| Uniform coloring properties | ◎ | ◎ | ◎ | Δ | X |
| Surface smoothness | ◎ | ◎ | ◎ | ○ | Δ |
| Gloss | ◎ | ◎ | ◎ | ○ | Δ |

Evaluation Procedure

Evaluation of scumming: The presence or absence of scumming is determined visually.

Evaluation of uniform coloring properties: Visual evaluation as well as measurement of L values (12 points or more) in a distance of 1 cm on a arbitrary line of a molding article are conducted using a color difference meter ("COLOR MACHINE Σ80" manufactured by Nippon Denshoku Industries Co., Ltd.). The average of the L values is calculated and, using the calculated value as a standard, dispersion (standard deviation) of the L values is calculated, which is taken as an index.

Evaluation of surface smoothness: Visual evaluation as well as determination of a quadric differential coefficient of the surface irregularity are conducted using a surface distortion meter "SURFMATIC" (Tokyo Boeki, Ltd.).

Surface gloss: It is evaluated visually and by gloss at 60° using a glossmeter (Murakami Color Research Laboratory: GM26D).

Evaluation Criteria

Good: ◎>○>Δ>X: Poor

Uniform Coloring Properties

◎: Any segregation is not visually observed, but dispersion (standard deviation) of the L values is 0.5 or less.

○: Segregation is scarcely observed visually, but dispersion (standard deviation) of the L values is 0.7 or less.

Δ: Slight segregation is visually observed, but dispersion (standard deviation) of the L values is more than 0.7 and less than 1.0.

X: Clear segregation is visually observed but, dispersion (standard deviation) of the L values is 1.0 or more. Surface smoothness ◎: Quadratic differential coefficient is 500 or less.
○: Quadratic differential coefficient is 700 or less.
Δ: Quadratic differential coefficient is more than 700 and less than 1000.
X: Quadratic differential coefficient is 1000 or more.

Surface Gloss

◎: Gloss at 60° C. is 90 or more.
○: Gloss at 60° C. is 85 or more.
Δ: Gloss at 60° C. is not less than 80 and less than 85.
X: Gloss at 60° C. is 80 or less.

As is apparent from the results described in Table 1 to Table 6, high compatibilizing effect can be obtained in any of Examples 5 to 24 using the compatibilizing agent solutions A-D which satisfied the conditions of the present invention, and any separation did not occur after a lapse of one month. On the other hand, sufficient compatibilizing effect could not be obtained in Comparative Examples 3–12 using the compatibilizing agent solutions E and F which do not satisfy the conditions of the present invention, and separation occurred in any case.

As is apparent from the results described in Table 7, any of Examples 25–27 satisfies the conditions of the present invention, thus making it possible to obtain a molded article which is free from scumming and has excellent uniform coloring properties, surface smoothness and surface gloss, molding defects caused by separation of the low profile additive of which are being improved by the compatibilizing agent. Since Comparative Examples 13 and 14 do not satisfy the conditions of the present invention, molding defects caused by separation of the low profile additive occurred in the molded articles.

What is claimed is:

1. A compatibilizing agent for compatibilizing a radical polymerizable unsaturated resin with a polymer containing styrene as a principal component, said compatibilizing agent being a compound (D) obtained by reacting a polymeric compound (A), a polymeric compound (B), and a compound (C), characterized in that:

the polymeric compound (A) is at least one polymeric compound which is a polymer containing polystyrene as a principal component, has within a molecule one or more functional groups capable of reacting with the compound (C), and has a number average molecular weight of 1,000 to 50,000;

the polymeric compound (B) is at least one polymeric compound having within a molecule one or more functional groups capable of reacting with the compound (C), which is selected from polyester, polyether, and polycarbonate; and the compound (C) is a compound having within a molecule one or more functional groups capable of reacting with the functional group of the polymeric compound (A) and one or more polyfunctional groups capable of reacting with the functional group of the polymeric compound (B);

wherein the total of the number of molecules of the polymeric compound (A) and the number of molecules of the polymeric compound (B) contained in a molecule of the compound (D) as a principal component of the compatibilizing agent is 3 or less; and wherein the number-average molecular weight of the compound (D) as a principal component of the compatibilizing agent is within a range of 1,000 to 60,000.

2. A compatibilizing agent according to claim 1, wherein the functional groups of the polymeric compound (A) capable of reacting with the compound (C) are one or more functional groups selected from a hydroxyl group, a carboxyl group, an epoxy group, an amino group, and a mercapto group.

3. A compatibilizing agent according to claim 1, wherein the functional groups of the polymeric compound (B) capable of reacting with the compound (C) are one or more functional groups selected from a hydroxyl group, a carboxyl group, an epoxy group, an amino group, and a mercapto group.

4. A compatibilizing agent according to claim 1, wherein the functional groups of the compound (C) are one or more functional groups selected from an isocyanate group, a hydroxyl group, a carboxyl group, an epoxy group, and an amino group.

5. A compatibilizing agent according to claim 1, wherein the compound (C) is an organopolyisocyanate compound.

6. A compatibilizing agent according to claim 1, wherein at least one of the functional groups of the polymeric compound (A) is located at a molecular terminal of the compound.

7. A compatibilizing agent according to claim 1, wherein the weight ratio (B)/(A) of the polymeric compound (A) and the polymeric compound (B) contained in a molecule of the compound (D) as a principal component of the compatibilizing agent is within a range of 0.2–5.

8. A molding material comprising the compatibilizing agent of claim 1, a polymer containing polystyrene as a principal component, a radical polymerizable unsaturated resin, a polymerizable unsaturated monomer, and a filler.

9. A molded article comprising a molding material comprising:
a compatibilizing agent for compatibilizing a radical polymerizable unsaturated resin with a polymer containing styrene as a principal component, a polymer containing polystyrene as a principal component, a radical polymerizable unsaturated resin, and a polymerizable unsaturated monomer,
wherein said compatibilizing agent is a compound (D) obtained by reacting a polymeric compound (A), a polymeric compound (B), and a compound (C), characterized in that:
the polymeric compound (A) is at least one polymeric compound which is a polymer containing polystyrene as a principal component, has within a molecule one or more functional groups capable of reacting with the compound (C), and has a number average molecular weight of 1,000 to 50,000;
the polymeric compound (B) is at least one polymeric compound having within a molecule one or more functional groups capable of reacting with the compound (C), which is selected from polyester, polyether, and polycarbonate; and
the compound (C) is a compound having within a molecule one or more functional groups capable of reacting with the functional group of the polymeric compound (A) and one or more polyfunctional groups capable of reacting with the functional group of the polymeric compound (B);
wherein the total of the number of molecules of the polymeric compound (A) and the number of molecules of the polymeric compound (B) contained in a molecule of the compound (D) as a principal component of the compatibilizing agent is 3 or less; and
wherein the number-average molecular weight of the compound (D) as a principal component of the compatibilizing agent is within a range of 1.000 to 60.000.

\* \* \* \* \*